United States Patent [19]
Saito et al.

[11] Patent Number: 5,805,389
[45] Date of Patent: Sep. 8, 1998

[54] MAGNETORESISTIVE HEAD

[75] Inventors: Masamichi Saito; Kiyoshi Satoh; Fumihito Koike, all of Niigata-ken, Japan

[73] Assignee: Alps Electric Co., Ltd., Tokyo, Japan

[21] Appl. No.: 718,061

[22] Filed: Sep. 17, 1996

[30] Foreign Application Priority Data

Sep. 21, 1995 [JP] Japan ................................... 7-243096

[51] Int. Cl.$^6$ ...................................................... G11B 5/39
[52] U.S. Cl. ............................................................ 360/113
[58] Field of Search ............................................. 360/113

[56] References Cited

U.S. PATENT DOCUMENTS 4,663,685  5/1987  Tsang ........................................ 360/113
5,495,378  2/1996  Bonyhard et al. ........................ 360/113

Primary Examiner—Robert S. Tupper
Attorney, Agent, or Firm—Guy W. Shoup

[57] ABSTRACT

A magnetoresistive head comprising longitudinal bias layers composed of $\alpha$-$Fe_2O_3$ provided under an magnetoresistive layer in close contact therewith, wherein an exchange anisotropic magnetic field is applied to the magnetoresistive layer from the longitudinal bias layers and the coercive force of the magnetoresistive layer is increased to several hundred Oe in exchange coupling regions with which the longitudinal bias layers are in close contact. The magnetization direction of the exchange coupling regions becomes stable in the x axis direction and sufficient longitudinal bias magnetic field is thereby applied to an region corresponding to the track width (Tw) of the magnetoresistive layer. Therefore, decreased Barkhausen noise and improved magnetic detection characteristics are achieved.

22 Claims, 2 Drawing Sheets

MAGNETORESISTIVE HEAD

BACKGROUND OF THE INVENTION

1. Field of the Invention

The present invention relates to a magnetoresistive head which is used for a magnetic head of a hard disk apparatus and which detects magnetic flux leakage from a recording medium utilizing the magnetoresistive effect. More particularly, the present invention relates to a magnetoresistive head having a antiferromagnetic layer of which is allowed to apply an effective longitudinal bias magnetic field to a magnetoresistive layer.

2. Description of the Related Art

FIG. 4 shows a front view of a magnetoresistive head according to a conventional exchange bias system. With respect to this magnetoresistive head, the running direction of a magnetic recording medium, such as a hard disk, is along the z axis and the direction of leakage magnetic field from the magnetic recording medium is along the y axis. On a lower insulating layer 1 comprising $Al_2O_3$ (aluminum oxide), etc., a soft magnetic layer (hereinafter referred to an SAL layer) 2, a non-magnetic layer (hereinafter referred to a SHUNT layer) 3, and a magnetoresistive layer (hereinafter referred to an MR layer) 4 are layered in given order from the bottom. Antiferromagnetic layers 5 and 5' are provided on both sides of the track width Tw on the MR layer 4. On the antiferromagnetic layers 5 and 5', corresponding lead layers 6 and 6' are layered. Further, an upper insulating layer 7 is provided thereon such that it covers the lead layers 6 and 6' and the MR layer 4.

The SAL layer 2, the SHUNT layer 3, and the MR layer 4 are respectively formed from an Fe-Ni-Nb (iron-nickel-niobium) alloy, Ta (tantalum), and an Ni-Fe (nickel-iron) alloy. The anti-ferromagnetic layers 5 and 5' are composed of one material selected from NiO (nickel oxide), an Ni-Mn (nickel-manganese) alloy, a Pt-Mn (platinum-manganese) alloy, and an Fe-Mn (iron-manganese) alloy. The lead layers 6 and 6' are composed of a conductive material, such as Cr (chromium), Ta (tantalum), and W (Tungsten).

In FIG. 4, the magnetoresistive layer 4 experiences a longitudinal bias magnetic field in the x axis direction from the antiferromagnetic layers 5 and 5'. In other words, exchange coupling regions (B regions) of the MR layer 4 located under the antiferromagnetic layers 5 and 5' are forced into a single domain state oriented in the x axis direction by an exchange anisotropic magnetic field (Hex) from the antiferromagnetic magnetic layers 5 and 5'. Being induced thereby, the magnetization direction of a region having a magnetoresistive function (A region), that is, the region within the track width (Tw) of the MR layer 4, is also forced along the x axis.

For reproduction from a magnetic recording medium, a stationary current is applied to the MR layer 4 through the lead layers 6 and 6'. At that time, the current magnetic field generated in the MR layer 4 is applied in the y axis direction, i.e., in the direction toward the side of the figure facing the viewer, to the SAL layer 2. Because of the static magnetic coupling energy produced by the SAL layer 2 due to the foregoing current magnetic field, a transverse bias magnetic field along the y axis is applied to the A region of the MR layer 4. The magnetization direction of the A region is set up to a middle angle between the x axis and the y axis, since both a longitudinal bias magnetic field along the x axis and a transverse bias magnetic field along the y axis are applied to the magnetoresistive layer 4. As a result, the resistance changes (the magnetoresistive characteristics; the H-R effect characteristics) are allowed to have a linear relationship to an external magnetic field (a leakage magnetic field from the recording medium) applied to the A region by the recording medium. Thus, the resistance changes in the A region are detected from the stationary current as a change in voltage.

The manufacturing process for the magnetoresistive head shown in FIG. 4 will be briefly described below. First, the SAL layer 2, the SHUNT layer 3, and the MR layer 4 are deposited on the lower insulating layer 1 in given order by sputtering. Then a resist layer is formed on a portion of the MR layer 4 corresponding to the track width Tw. The antiferromagnetic layers 5 and 5' and the lead layers 6 and 6' are deposited on both sides of the track width Tw by sputtering while leaving the resist layer as it is; and then the resist layer is removed. The upper insulating layer 7 is further deposited thereon so as to obtain a magnetoresistive head, as shown in FIG. 4.

In the above mentioned magnetoresistive head according to a conventional exchange bias system, the B regions of the MR layer 4 composed of an Ni-Fe based material experience an exchange anisotropic magnetic field of at most several dozen Oe (oersted) from the antiferromagnetic layers 5 and 5' composed of NiO, an Fe-Mn alloy or the like. Moreover, the coercive force of the MR layer 4 composed of an Ni-Fe based material is small so that the magnetization along the x axis is unstable in the B regions.

Therefore, the magnetization along the x axis is rendered unstable in the B regions of the MR layer 4 because of the leakage magnetic field along the y axis from a magnetic recording medium. It becomes thereby impossible for the B regions to apply a stable longitudinal bias magnetic field in the x axis direction to the A region. As a result, the Barkhausen noise is disadvantageously increased due to the variation of the magnetization direction of the A region.

A hard bias system is a known method of applying a stable longitudinal bias magnetic field to an MR layer. According to this system, hard bias layers are composed of a magnetic material having a high coercive force of several hundred Oe and they are formed on both sides of the MR layer. A magnetic field along the x axis is applied to the MR layer by the permanently magnetizing the hard bias layers in the x axis direction.

According to conventional hard bias systems, the hard bias layers are arranged in contact with both sides of the MR layer, the SHUNT layer, and the SAL layer. Therefore, it is difficult to efficiently apply the magnetization of the hard bias layers to only the MR layer. In addition, the MR layer cannot always experience a sufficient longitudinal bias magnetic field because the static magnetic coupling between the MR layer and the hard bias layers becomes insufficient at a contact face.

SUMMARY OF THE INVENTION

Given the above-described requirements, it is an object of the present invention to provide a magnetoresistive head having a decreased Barkhausen noise by providing an exchange coupling region of an MR layer which is readily and permanently magnetized by applying a magnetic field thereto and increasing the coercive force thereof. The degree of a single domain state is thereby elevated in a track width (Tw) region of the MR layer.

The present invention is characterized by a magnetoresistive head comprising a magnetoresistive layer, a non-magnetic layer formed on the magnetoresistive layer, and a soft magnetic layer formed on the non-magnetic layer; and antiferromagnetic layer portions for applying a longitudinal bias magnetic field in a direction along a recording face of a magnetic recording medium to the magnetoresistive layer; wherein the antiferromagnetic layer portions having an interval therebetween in the track width direction are in contact with the magnetoresistive layer, apply an exchange anisotropic magnetic field to the magnetoresistive layer, and increase the coercive force of the magnetoresistive layer.

In the above magnetoresistive head, for example, the antiferromagnetic layer portions are composed of $\alpha$-$Fe_2O_3$.

Moreover, in a magnetoresistive head according to the present invention, a magnetoresistive layer is layered on antiferromagnetic layer portions and, further, a non-magnetic layer and a soft magnetic layer are layered on the magnetoresistive layer in given order: or in another magnetoresistive head according to the present invention, a magnetoresistive layer, a nonmagnetic layer, and a soft magnetic layer are layered in given order from the bottom; both sides of a portion which has a given dimension in the track width direction are removed from the non-magnetic layer and the soft magnetic layer; and, on both sides of the portion, antiferromagnetic layer portions are layered in close contact with the magnetoresistive layer.

According to a magnetoresistive head of the present invention, an MR layer is formed to a uniform film-thickness and antiferromagnetic layer portions are securely in close contact with the MR layer on both sides of the track width. Therefore, excellent exchange anisotropic coupling is established in the exchange coupling regions (B regions) of the MR layer, with which the antiferromagnetic layer portions are in close contact, and the exchange coupling regions (B regions) of the MR layer experience a stable exchange anisotropic magnetic field (Hex) in the x axis direction from the antiferromagnetic layer portions. In addition, antiferromagnetic layer portions composed of $\alpha$-$Fe_2O_3$, etc. increase the coercive force of the MR layer in close contact therewith, since the MR layer is composed of an Ni-Fe alloy. Therefore, the coercive force (Hc) and the function of the B regions become similar to those of hard bias layers of conventional hard bias systems such that the B regions have a coercive force (Hc) of as high as several hundred Oe and a strong longitudinal bias magnetic field along the x axis is applied to the A region so as to securely force the A region into a single domain state oriented along the x axis.

Further, since the B regions of the MR layer have a high coercive force, the magnetization direction thereof are not readily affected by an external magnetic field, such as a leakage magnetic field. Therefore, it becomes possible to apply a stable longitudinal bias magnetic field to the A region of the MR layer so as to decrease the Barkhausen noise.

DETAILED DESCRIPTION OF THE PREFERRED EMBODIMENT

The present invention will be better understood from the following preferred embodiments taken in conjunction with the accompanying drawings.

Figure 1:
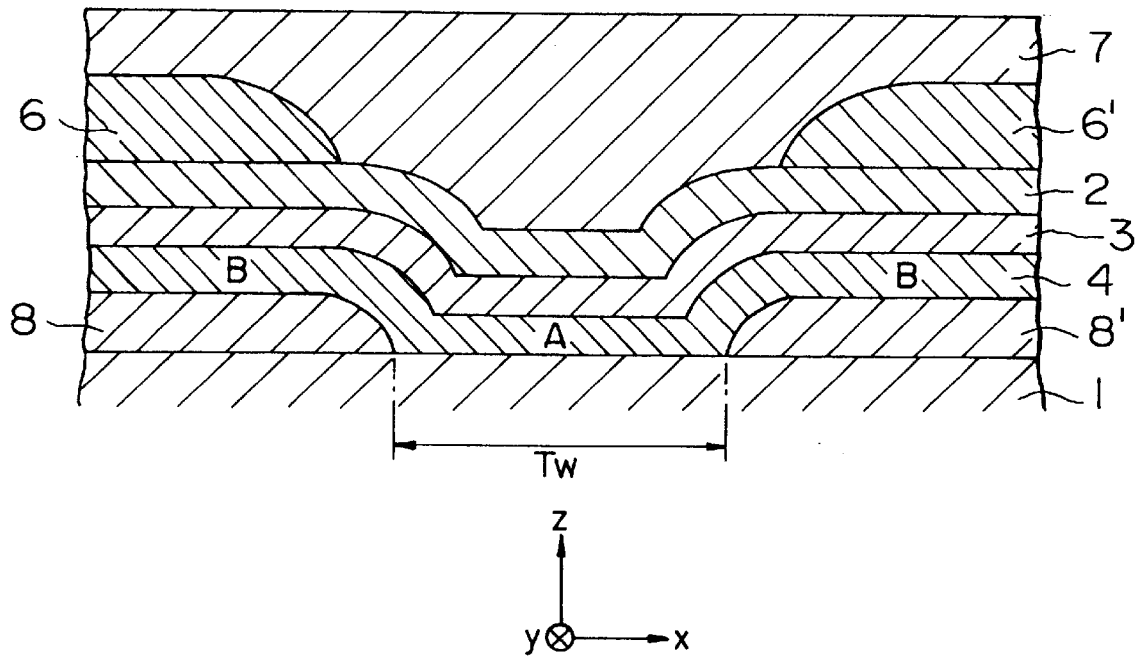
FIG. 1 is a front view of a magnetoresistive head according to the present invention.
Figure 2:
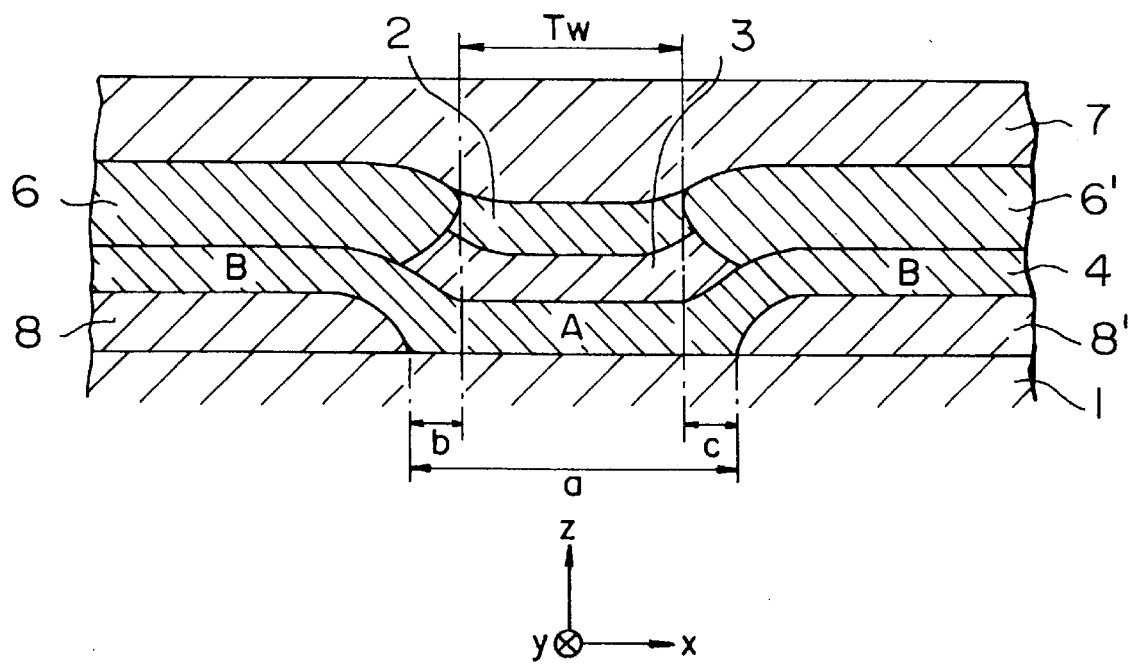
FIG. 2 is a front view of another magnetoresistive head according to the present invention.
Figure 3:
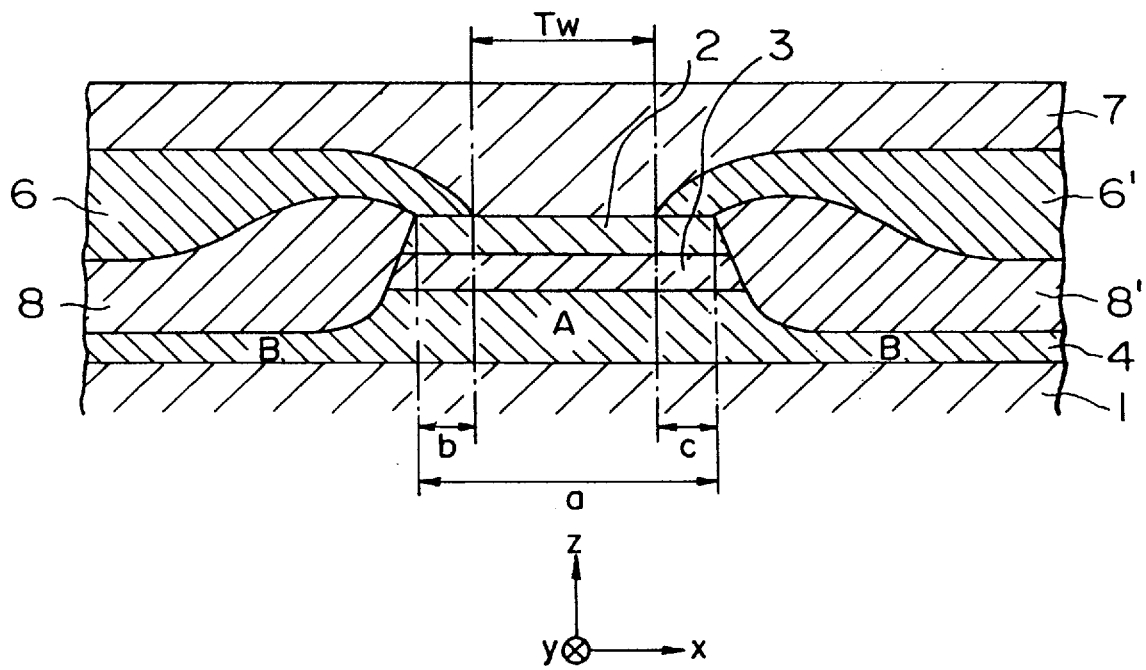
FIG. 3 is a front view of another magnetoresistive head according to the present invention.
Figure 4:
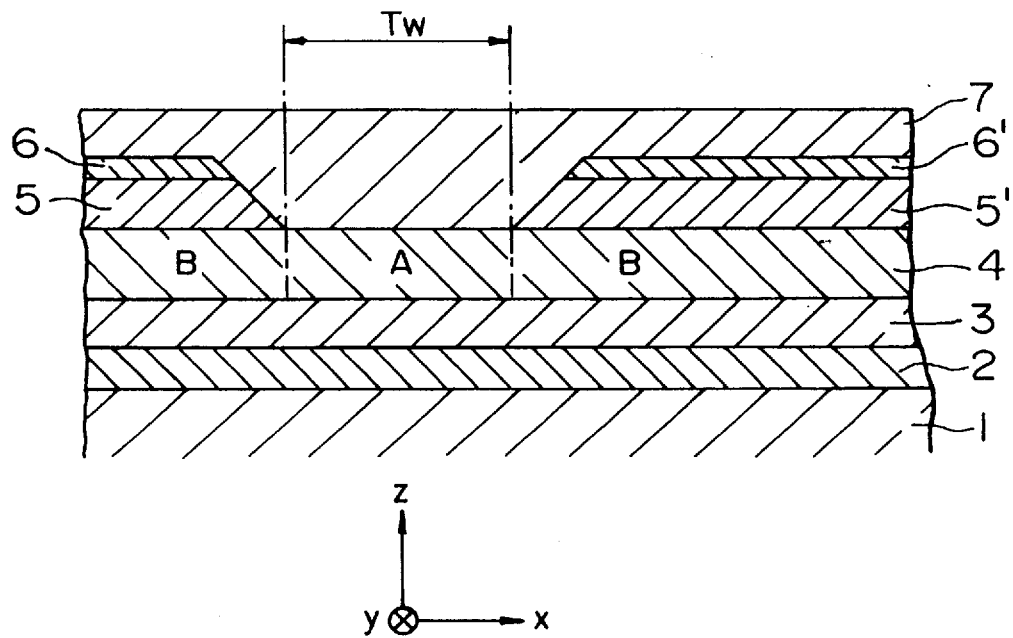
FIG. 4 is a front view of a magnetoresistive head according to a conventional exchange bias system.

Each of FIGS. 1 to 3 shows a front view showing a structure of a corresponding magnetoresistive head of the present invention. In each figure, a recording face of a recording medium, such as a hard disk, is set to be parallel to the paper face of the figure and opposite to the magnetoresistive head. The x axis is in the track width direction, the z axis is in the relative movement direction of the magnetic head with respect to the recording medium, and the y axis (in the direction toward the side of the figure facing the viewer) is in the direction of a leakage magnetic field applied to the magnetic head by the recording medium.

In a magnetic head shown in FIG. 1, antiferromagnetic layer portions 8 and 8' are formed to at least 200 Å thick and, preferably, from 500 to 1,000 Å thick, at a given interval, i.e., at a track width Tw in the x axis direction, on a lower insulating layer 1 composed of $Al_2O_3$. An MR layer 4 is deposited thereon to a given thickness. In the MR layer 4, a portion directly deposited on the lower insulating layer 1 corresponding to the track width Tw is the magnetoresistive functional region (the A region), and those layered on the antiferromagnetic layer portions 8 and 8' are the exchange coupling regions (the B regions).

The MR layer 4 and the antiferromagnetic layer portions 8 and 8' are respectively composed of an Ni-Fe based material and $\alpha$-$Fe_2O_3$ (iron oxide). On the MR layer 4, a SHUNT layer 3 and an SAL layer 2 respectively composed of Ta and an Fe-Ni-Nb based material are layered in parallel with each other in given order from the bottom. On the SAL layer 2, lead layers 6 and 6' are formed with an interval of a lead track width therebetween. The lead layers 6 and 6' are composed of a conductive material, such as Cr, Ta, and W. An upper insulating layer 7 composed of $Al_2O_3$, etc. is layered on the top thereof.

Under the MR layer 4 composed of an Ni-Fe based material, the antiferromagnetic layer portions 8 and 8' composed of $\alpha$-$Fe_2O_3$ are provided in close contact therewith. Because of this close contact, the B regions of the MR layer 4 experience an exchange anisotropic magnetic field (Hex) of several dozen Oe from the antiferromagnetic layer portions 8 and 8'. The strength of the exchange anisotropic magnetic field (Hex) is almost the same as those produced by materials, such as NiO and an Fe-Mn alloy, contained in conventional exchange bias layers; and, practically, it was 50 to 100 Oe in this embodiment when the MR layer 4 was 200 Å thick. As is shown in FIG. 1, the antiferromagnetic layer portions 8 and 8' are deposited to a uniform thickness on the corresponding B regions of the MR layer, which also has a uniform thickness, in parallel and in close contact therewith. Therefore, the B regions of the MR layer 4 have excellent exchange anisotropic coupling with the antiferromagnetic layer portions 8 and 8', and they are rendered in a single domain state oriented along the x axis by the exchange anisotropic magnetic field (Hex) of the antiferromagnetic layer portion 8 and 8'.

In addition, the coercive force of the Ni-Fe based material increases to 200 to 800 Oe when the material is in close contact with $\alpha$-$Fe_2O_3$. In other words, the B regions of the MR layer in close contact with the antiferromagnetic layer portions 8 and 8' are allowed to have a coercive force of several hundred Oe. When the B regions have a high coercive force, the stability of the exchange anisotropic magnetic field applied thereto will not be affected by a leakage magnetic field from a magnetic recording medium. Therefore, the magnetization of the B regions due to the exchange anisotropic magnetic field of the antiferromagnetic layer portions 8 and 8' becomes stable and, being induced thereby, the A region of the MR layer 4 is reliably forced into a single domain state oriented along the x axis.

Furthermore, since the B regions have a high coercive force due to the close contact with $\alpha$-$Fe_2O_3$, they can be permanently magnetized along the x axis. The A region is thereby reliably forced into a single domain state oriented in the x axis direction. As above-mentioned, both the longitudinal bias magnetic field of the exchange bias and that of the hard bias can be applied to the A region by using $\alpha$-$Fe_2O_3$ for the antiferromagnetic layer portions 8 and 8'.

For reproduction from a magnetic recording medium, a stationary current is applied to the MR layer 4 through the lead layers 6 and 6'; a current magnetic field is thereby generated in the y axis direction, i.e., in the direction toward the side of the figure facing the viewer, in the MR layer 4; and is applied in the y axis direction to the SAL layer 2. The MR layer 4 experiences a transverse SAL bias magnetic field in the y axis direction due to the static magnetic coupling energy produced by the SAL layer 2. Since the longitudinal bias magnetic field and the transverse SAL bias magnetic field are applied to the A region, the magnetization direction thereof is aligned in a direction midway between the x axis and the y axis. The magnetization direction of the A region varies according to a leakage magnetic field in the y axis direction from a magnetic recording medium. Thus, the resistance changes in the A region is detected by utilizing the stationary current.

In the magnetoresistive head shown in FIG. 1, the magnetization of the B regions of the MR layer 4 is stable in the x axis direction because of a high coercive force of the regions, as is mentioned in the above. Even if an external magnetic field, such as a leakage magnetic field from a magnetic recording medium, is applied to the B regions, the magnetization thereof is not affected and is stably maintained in the x axis direction because of the high coercive force thereof. Therefore a stable longitudinal bias magnetic field is reliably applied to the A region of the MR layer 4 so that the magnetization direction of the A region becomes stable and the Barkhausen noise is suppressed.

The manufacturing process for the foregoing magnetoresistive head shown in FIG. 1 will be briefly described below. First, a antiferromagnetic layer is deposited to at least 200 Å, more preferably, 400 Å or more, on the whole surface of the lower insulating layer 1 by sputtering. An exceedingly thick film disadvantageously increases the steps of films deposited thereon. Thus, a thickness of 1,000 Å or less is preferable. A portion corresponding to a track width Tw is removed from the antiferromagnetic layer, and the lower insulating layer 1 is exposed at that portion by either of the following fabricating processes: Resist layers having an interval of a predetermined track width therebetween are formed on the antiferromagnetic layer, followed by etching, such as ion milling, and then, a portion of the antiferromagnetic layer (a region corresponding to the track width Tw) on which no resist layer is formed is removed; or a resist layer may be formed on a portion of the lower insulating layer 1 corresponding to the track width Tw and the antiferromagnetic layer may be deposited on the portions of the lower insulating layer 1 having no resist layer thereon (portions corresponding to the both sides of the track width Tw) by sputtering.

After removing the resist layers, the MR layer 4, the SHUNT layer 3, and the SAL layer 2 are sequentially deposited by sputtering. The B regions of the MR layer 4 are thereby in close contact with the antiferromagnetic layer portions 8 and 8', and the A region is directly deposited on the lower insulating layer 1. Further, another resist layer is formed on a portion corresponding to a given lead track width of the SAL layer 2, and then, the lead layers 6 and 6' are deposited thereon by sputtering. In other words, the lead layers 6 and 6' are deposited on regions having no resist layer thereon, that is, on regions on both sides of the lead track width. The magnetoresistive head shown in FIG. 1 is obtained by depositing the upper insulating layer 7 on the SAL layer 2 and the lead layers 6 and 6' after removing the resist layer 2.

The manufacturing process for another magnetoresistive head shown in FIG. 2 will be described below. Similarly to the magnetoresistive head shown in FIG. 1, the antiferromagnetic layer portions 8 and 8', which are composed of $\alpha$-$Fe_2O_3$ and which have a predetermined interval a therebetween, are deposited on a lower insulating layer 1 to a thickness of at least 200 Å or more and, more preferably, from 400 to 1,000 Å. An MR layer 4 composed of an Ni-Fe based material is deposited to a uniform film-thickness on the antiferromagnetic layer portions 8 and 8' and the lower insulating layer 1. Similarly to the magnetoresistive head shown in FIG. 1, the antiferromagnetic layer portions 8 and 8' are in close contact with the B regions of the MR layer 4 so that the magnetization direction of the B regions are stable.

In FIG. 2, a SHUNT layer 3 and an SAL layer 2 are deposited in given order on the center area of the MR layer 4; and the track width Tw is determined by the x axial width of the SAL layer 2. Lead layers 6 and 6' are deposited on both sides of the SHUNT layer 3 and the SAL layer 2; and an upper insulating layer 7 is provided on the SAL layer 2 and the lead layers 6 and 6'.

Similarly to the magnetoresistive head shown in FIG. 1, in the magnetoresistive head shown in FIG. 2, stable magnetization along the x axis can be expected in the B regions of the MR layer 4 composed of an Ni-Fe based material because the antiferromagnetic layer portions 8 and 8' composed of $\alpha$-$Fe_2O_3$ are in close contact with the MR layer 4.

However, in FIG. 1, the SAL layer 2 producing the SAL bias magnetic field (the transverse bias magnetic field) extends along the x axis to both sides of the track width Tw. Therefore, a leakage magnetic field of a magnetic recording medium not corresponding to the track width Tw is applied to the SAL layer 2 so that the Barkhausen noise increases and the offtrack characteristics are impaired.

Meanwhile, in the magnetoresistive head shown in FIG. 2, the foregoing disadvantages are eliminated because the track width Tw is determined by the width of the SAL layer 2. Further, in this structure, the dimensions a, b, and c are readily set up, in other words, the dimensional stability of the track width Tw is excellent, because the track width Tw of the SAL layer 2 is determined with high precision by etching processes, such as ion milling.

In the manufacturing process for the magnetoresistive head shown in FIG. 2, the antiferromagnetic layer portions 8 and 8' having a predetermined interval a therebetween are deposited on the lower insulating layer 1; and the MR layer 4, the SHUNT layer 3, and the SAL layer 2 are sequentially deposited on the lower insulating layer 1 and the antiferromagnetic layer portions 8 and 8' by sputtering, as is similar to the magnetoresistive head shown in FIG. 1. After that, a resist layer is formed on the SAL layer 2 so as to determine the track width Tw, and then, portions corresponding to both sides of the track width Tw are removed from the SHUNT layer 3 and the SAL layer 2 by an etching process, such as ion milling. While leaving the resist layer, the lead layers 6 and 6' are deposited on both sides thereof. The upper insulating layer 7 is deposited after removing the resist layer.

In a magnetoresistive head shown in FIG. 3, antiferromagnetic layer portions 8 and 8' are deposited on an MR layer 4 in close contact therewith. The preferable thickness of the antiferromagnetic layer magnetic 8 and 8' is at least 200 Å, but the SAL layer 2 is hard to contact with lead layers 6 and 6' when the antiferromagnetic layer portions 8 and 8' are too thick.

In a magnetoresistive head shown in FIG. 3, the MR layer 4, the SHUNT layer 3, and the SAL layer 2 are sequentially deposited on a lower insulating layer 1 by sputtering. A resist layer is formed on a portion of the SAL layer 2 corresponding to an interval a. Then, portions corresponding to both sides of the interval a are completely removed from the SHUNT layer 3 and the SAL layer 2, and partially removed from the MR layer 4 by an etching process, such as ion milling. While leaving the resist layer on the SAL layer 2, the antiferromagnetic layer portions 8 and 8' are deposited by sputtering $\alpha\text{-Fe}_2\text{O}_3$. Since the MR layer 4 is partially removed so that the SHUNT layer 3 is not left on the B regions, the antiferromagnetic portions 8 and 8' are directly deposited on the MR layer 4 in completely close contact therewith.

After removing the foregoing resist layer, another resist layer corresponding to a track width Tw is formed on the SAL layer; and the lead layers 6 and 6' are deposited on both sides of this resist layer. An upper insulating layer 7 is deposited thereon. The preferable thickness of the antiferromagnetic layer portions 8 and 8' is at least 200 Å, but the SAL layer 2 is hard to contact with lead layers 6 and 6' when the antiferromagnetic layer portions 8 and 8' are too thick. Thus a thickness of 600 Å or less is preferable.

Similarly to the magnetoresistive heads shown in FIGS. 1 and 2, the longitudinal bias magnetic field applied to the A region of the MR layer 4 becomes stable in the embodiment shown in FIG. 3 because the B regions of the MR layer 4 composed of an Ni-Fe based material is in close contact with the antiferromagnetic layer portions 8 and 8' composed of $\alpha\text{-Fe}_2\text{O}_3$. In addition, since the B region of the MR layer 4 is thin, the exchange anisotropic magnetic field increases such that the longitudinal bias magnetic field becomes further stable.

Similarly to the embodiment shown in FIG. 2, excellent offtrack characteristics can be obtained because the SAL layer 2 does not extend along the x axis to both sides of the track width Tw. In addition, the track width Tw is determined with high precision by the interval between the lead layers 6 and 6'.

As above mentioned, according to a magnetoresistive head of the present invention, an exchange anisotropic magnetic field is applied to an MR layer from antiferromagnetic layer portions composed of $\alpha\text{-Fe}_2\text{O}_3$, etc. and the coercive force of the MR layer is increased in portions in close contact with the antiferromagnetic layer portions. A sufficient longitudinal bias magnetic field is thereby applied to the track width (Tw) portion of the MR layer, thus decreasing the Barkhausen noise.

What is claimed is:

1. A magnetoresistive head comprising:
   a magnetoresistive layer including first and second exchange coupling regions separated by a magnetoresistive functional region,
   a non-magnetic layer formed over the magnetoresistive layer,
   a soft magnetic layer formed on the nonmagnetic layer; and
   an antiferromagnetic layer for applying a longitudinal bias magnetic field in a direction along a recording face of a magnetic recording medium to said magnetoresistive layer;
   wherein said antiferromagnetic layer includes first and second portions having an interval therebetween in the track width direction; and
   wherein the first and second portions are in direct contact with said first and second exchange coupling regions of said magnetoresistive layer, respectively, such that said first and second portions of said antiferromagnetic layer apply an exchange anisotropic magnetic field to said first and second exchange coupling regions of said magnetoresistive layer, and increase the coercive force of said magnetoresistive layer, thereby forming a longitudinal magnetic field in the magnetoresistive functional region of the magnetoresistive layer.

2. A magnetoresistive head as set forth in claim 1, wherein said antiferromagnetic layer consists of $\alpha\text{-Fe}_2\text{O}_3$.

3. A magnetoresistive head as set forth in claim 1, wherein the first and second exchange coupling regions of the magnetoresistive layer, which are directly contacted by said first and second portions of said antiferromagnetic layer, apply a longitudinal magnetic field to the magnetoresistive layer in said magnetoresistive functional region by both exchange anisotropic magnetic field and a permanent magnetic field corresponding to a value of said coercive force.

4. A magnetoresistive head as set forth in claim 3, wherein said antiferromagnetic layer is composed of $\alpha\text{-Fe}_2\text{O}_3$.

5. A magnetoresistive head comprising:
   an insulating layer;
   an antiferromagnetic layer formed on said insulating layer, the antiferromagnetic layer including first and second portions separated by a predetermined space corresponding to a track width of said magnetoresistive head;
   a magnetoresistive layer including a magnetoresistive functional region directly contacting said insulating layer in said predetermined space between the first and second portions of the antiferromagnetic layer, and first and second exchange coupling regions respectively formed on the first and second portions of the antiferromagnetic layer;
   a non-magnetic layer formed on said magnetoresistive layer; and
   a soft magnetic layer formed on said non-magnetic layer;
   wherein said first and second portions of said antiferromagnetic layer apply an exchange anisotropic magnetic field to the first and second exchange coupling regions of the magnetoresistive layer, thereby increasing a coercive force of the magnetoresistive layer; and
   wherein said first and second exchange coupling regions of the magnetoresistive layer apply a longitudinal magnetic field to the magnetoresistive functional region in said predetermined space by the exchange anisotropic magnetic field.

6. A magnetoresistive head as set forth in claim 5, wherein said antiferromagnetic layer consists of $\alpha\text{-Fe}_2\text{O}_3$.

7. A magnetoresistive head as set forth in claim 5, wherein the first and second exchange coupling regions of the magnetoresistive layer, which are directly contacted by said first and second portions of said antiferromagnetic layer, apply a longitudinal magnetic field to the magnetoresistive layer in said magnetoresistive functional region by both exchange anisotropic magnetic field and a permanent magnetic field corresponding to a value of said coercive force.

8. A magnetoresistive head as set forth in claim 6, wherein a film thickness of said antiferromagnetic layer is 200 to 1000 Å.

9. A magnetoresistive head as set forth in claim 6, wherein a film thickness of said antiferromagnetic layer is 400 to 1000 Å.

10. A magnetoresistive head as set forth in claim 7, wherein said antiferromagnetic layer is composed of $\alpha$-$Fe_2O_3$.

11. A magnetoresistive head as set forth in claim 10, wherein a film thickness of said antiferromagnetic layer is 200 to 1000 Å.

12. A magnetoresistive head as set forth in claim 10, wherein a film thickness of said antiferromagnetic layer is 400 to 1000 Å.

13. A magnetoresistive head comprising:

an insulating layer;

an antiferromagnetic layer formed on said insulating layer, the antiferromagnetic layer including first and second portions separated by a predetermined space which is larger than a track width of said magnetoresistive head;

a magnetoresistive layer including a magnetoresistive functional region directly contacting said insulating layer in said predetermined space between the first and second portions of the antiferromagnetic layer, and first and second exchange coupling regions respectively formed on the first and second portions of the antiferromagnetic layer;

a non-magnetic layer formed on the magnetoresistive functional region of said magnetoresistive layer; and a soft magnetic layer formed on said non-magnetic layer, said soft magnetic layer having a length corresponding to the track width of the magnetoresistive head;

a lead layer having first and second lead portions respectively formed on the first and second exchange bias regions of the magnetoresistive layer and contacting opposing sides of said non-magnetic layer and said soft magnetic layer;

wherein said first and second portions of said antiferromagnetic layer apply an exchange anisotropic magnetic field to the first and second exchange coupling regions of the magnetoresistive layer, thereby increasing a coercive force of the magnetoresistive layer; and wherein said first and second exchange coupling regions of the magnetoresistive layer apply a longitudinal magnetic field to the magnetoresistive functional region in said predetermined space by the exchange anisotropic magnetic field.

14. A magnetoresistive head as set forth in claim 13, wherein said antiferromagnetic layer consists of $\alpha$-$Fe_2O_3$.

15. A magnetoresistive head as set forth in claim 13, wherein the first and second exchange coupling regions of the magnetoresistive layer, which are directly contacted by said first and second portions of said antiferromagnetic layer, apply a longitudinal magnetic field to the magnetoresistive layer in said magnetoresistive functional region by both exchange anisotropic magnetic field and a permanent magnetic field corresponding to a value of said coercive force.

16. A magnetoresistive head as set forth in claim 14, wherein a film thickness of said antiferromagnetic layer is 200 to 1000 Å.

17. A magnetoresistive head as set forth in claim 14, wherein a film thickness of said antiferromagnetic layer is 400 to 1000 Å.

18. A magnetoresistive head as set forth in claim 15, wherein said antiferromagnetic layer consists of $\alpha$-$Fe_2O_3$.

19. A magnetoresistive head as set forth in claim 18, wherein a film thickness of said antiferromagnetic layer is 200 to 1000 Å.

20. A magnetoresistive head as set forth in claim 18, wherein a film thickness of said antiferromagnetic layer is 400 to 1000 Å.

21. A magnetoresistive head comprising:

an insulating layer;

a magnetoresistive layer formed on said insulating layer, the magnetoresistive layer including a magnetoresistive functional region located between first and second exchange coupling regions, the magnetoresistive functional region having a thickness which is greater than a thickness of said first and second exchange coupling regions, the magnetoresistive functional region having a length which is greater than a track width of said magnetoresistive head;

a non-magnetic layer formed on the magnetoresistive functional region of said magnetoresistive layer; and a soft magnetic layer formed on said non-magnetic layer;

an antiferromagnetic layer having first and second portions respectively formed on the first and second exchange bias regions of the magnetoresistive layer and contacting opposing sides of said non-magnetic layer and said soft magnetic layer; and a lead layer having first and second lead portions respectively formed on the first and second portions of the antiferromagnetic layer, said first and second lead portions being spaced apart by a distance corresponding to the track width of the magnetoresistive head;

wherein said first and second portions of said antiferromagnetic layer apply an exchange anisotropic magnetic field to the first and second exchange coupling regions of the magnetoresistive layer, thereby increasing a coercive force of the magnetoresistive layer; and wherein said first and second exchange coupling regions of the magnetoresistive layer apply a longitudinal magnetic field to the magnetoresistive functional region in said predetermined space by the exchange anisotropic magnetic field.

22. A magnetoresistive head as set forth in claim 21, wherein a film thickness of said antiferromagnetic layer is 200 to 600 Å.

* * * * *